Nov. 4, 1947.  J. L. KIPNIS  2,430,125
DEVICE FOR INDICATING THE SYNCHRONIZATION
OF TWO REVOLVING OR ROTATING BODIES
Filed Oct. 16, 1944
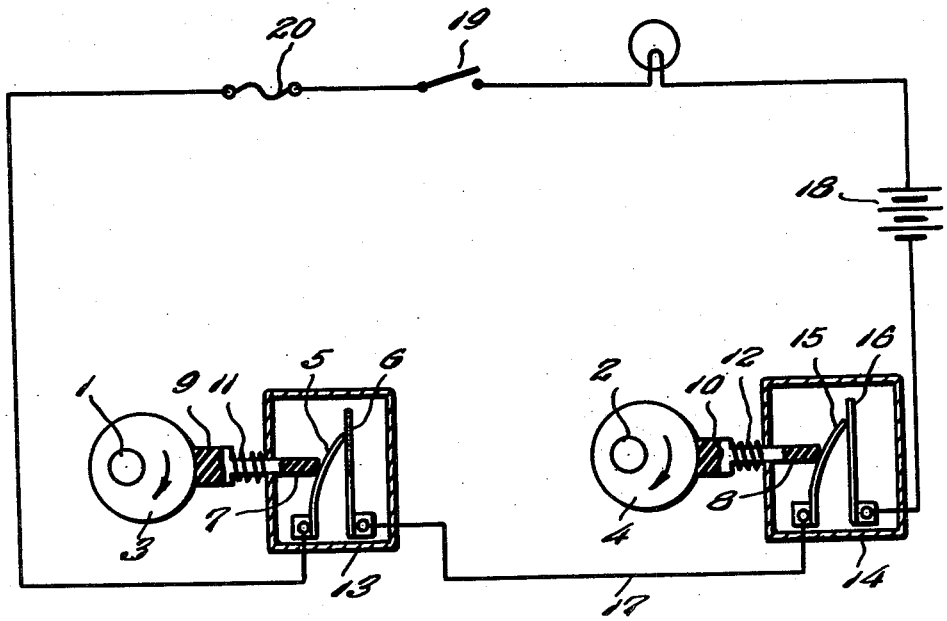
Inventor
*Jerome L. Kipnis*
By *Clarence A. O'Brien
and Harvey B. Jacobson*
Attorneys Patented Nov. 4, 1947

2,430,125

UNITED STATES PATENT OFFICE 2,430,125

DEVICE FOR INDICATING THE SYNCHRONIZATION OF TWO REVOLVING OR ROTATING BODIES

Jerome L. Kipnis, Jacksonville, Fla.

Application October 16, 1944, Serial No. 558,922

1 Claim. (Cl. 177—311)

This invention relates to a device for indicating the synchronization of revolving or rotating elements such as rotating shafts and it has for its primary object to provide a simple and effective device of this type indicating not only when the state of synchronization has been reached but also indicating when the said rotating or revolving bodies are off synchronization and permitting to determine the difference in the number of revolutions.

Arrangement of this type as hitherto known use various complicated synchronism indicating devices and a plurality of circuits and indicating devices for each direction of rotation of the shafts and for each type of deviation from synchronism such as the advance or retardation of one shaft with respect to another considered as the standard or basic shaft.

The present invention consists in an arrangement in which the rotating shafts, by means of spring-pressed contact plungers operated by cams or similar means, rhythmically close and open contacts during their rotation, which are jointly acting on an indicator. The joint action will result in a steady or permanent signal indication of some kind, such as the lighting or extinguishing of a lamp, in the case of synchronism, but will result in an unsteady or fluctuating signal in the absence of synchronism, due to a retardation or acceleration of one of the shafts with respect to the other.

This type of signal, as will be readily understood, is independent of the direction of rotation and is solely dependent on their relative speed. It is also independent of the fact as to which shaft leads and which shaft lags. The signal arrangement may, therefore, be used with completely independent shafts whatever their direction of rotation or speed. It is, however, particularly adapted for high speeds.

The unsteady or fluctuating signal as produced by th above described means will not only indicate a lack of synchronism but will also furnish, by means of the frequency of the fluctuation, an exact indication as regards the prevailing deviation from synchronism.

This fact, in the event that one of the shafts or both have to be regulated, will furnish an indication as to the extent of the required regulation or adjustment.

The invention is illustrated by way of example in the single figure of the drawing which is a diagram showing the contacts and their connection.

In the specific example illustrated the elements whose synchronization has to be measured are the rotating shafts 1, 2, which may be the driving shafts of two engines driving two propellers of an airplane or of a boat, which shafts are supposed to operate in a synchronous manner. The nature of the mechanisms to be driven by the shafts is however manifestly not of importance.

On the shafts whose synchronization is to be indicated or on auxiliary or indicator shafts coupled therewith and deriving their motion therefrom, cams 3, 4 are arranged operating contacts 5, 6; 15, 16 by means of spindles 7, 8, of insulating material carrying contact heads 9, 10. Coil springs 11, 12 are arranged on the spindles to return the latter and to keep the contact heads 9, 10 in permanent contact with the cams. The contacts may be enclosed in boxes 13, 14.

The contact pairs 5, 6; 15, 16 are arranged in series in a circuit 17 containing a battery 18, a single pole switch 19, a fuse 20 and an indicator 21 which may be a lamp as shown or an acoustic device.

The shafts 1, 2, may rotate at engine speed or at as high a speed as possible, if auxiliary shafts are used. They may rotate in the same or in opposite directions.

The indicator lamp 21 will be lighted once during each rotation of the shafts 1, 2 if the shafts are in synchronism. Or it may be that the lamp is permanently extinguished when it happens that the cams have a phase difference of 180°. Each of these states of the lamp is indicative of perfect synchronism.

If the two shafts are not in synchronism the effect is the same as if one of the shafts would be at a standstill while the other is running with the difference between the rotational speeds. Assuming for instance shaft 1 to run at 3000 R. P. M. and shaft 2 at 3010 R. P. M., then the effect is the same as if contacts 5, 6 were permanently closed with shaft 1 at a standstill, while shaft 2 is running with 10 R. P. M. In this case, during one minute shaft 2 closes contacts 15, 16, ten times and opens them ten times. This will result in a blinking, the light appearing every 6 seconds and disappearing every 6 seconds.

It is obvious that the light will blink once for every revolution one shaft is making relative to the other and it is therefore only necessary to count the number of blinkings per minute to know exactly the difference in the speed of rotation between the shafts.

It will be noted that if the synchronism is perfect and the lamp is lighted, the lamp in reality will be lit once and be extinguished once during every revolution of the shaft. However, for almost all puropses the number of revolutions per minute is so high that this, even in the most unfavorable cases amounts only to a steady flickering of the light, which is hardly perceived if the shafts rotate at more than 1000 R. P. M. when the number of cycles per second is about 17. This steady flickering is easily distinguished from the blinking due to lack of synchronism.

When frequencies of the acoustic range may be used, an acoustic device such as a telephone, may be used announcing synchronism by a high pitched tone, and a lack of synchronism by low beat tones.

It will be understood that the diagram shows only one example of the means carrying the invention into effect and that other means may be used as will be clear to those skilled in the art, without departing from the essence of the invention.

What I claim is:

A device for indicating the presence and absence of synchronism of rotating shafts and the extent of the deviation from synchronism, comprising spring-pressed contact plungers, means on said shafts for operating the same, spring contacts operated by the said plungers, a common indicator signal, and means for producing alternatively a steady signal upon synchronism of the rotating shafts and a fluctuating signal upon deviation from synchronism, said means comprising a joint series connection of the aforesaid contacts, associated with all the shafts, with the indicator signal.

JEROME L. KIPNIS.

REFERENCES CITED

The following references are of record in the file of this patent:

UNITED STATES PATENTS

| Number | Name | Date |
|---|---|---|
| 1,450,620 | Warren | Apr. 3, 1923 |
| 2,146,632 | Lamb | Feb. 7, 1939 |
| 360,986 | Beale | Apr. 12, 1887 |

FOREIGN PATENTS

| Number | Country | Date |
|---|---|---|
| 200,647 | Germany | Aug. 12, 1906 |